(12) United States Patent
Kitade et al.

(10) Patent No.: US 6,938,284 B2
(45) Date of Patent: Sep. 6, 2005

(54) LAVATORY UNIT FOR AIRCRAFT

(75) Inventors: Koichi Kitade, Tokyo (JP); Ryoichi Itakura, Tokyo (JP); Toshihisa Kasuya, Tokyo (JP)

(73) Assignee: Jamco Corporation, Tokyo (JP)

( * ) Notice: Subject to any disclaimer, the term of this patent is extended or adjusted under 35 U.S.C. 154(b) by 52 days.

(21) Appl. No.: 10/726,525

(22) Filed: Dec. 4, 2003

(65) Prior Publication Data

US 2004/0123381 A1 Jul. 1, 2004

(30) Foreign Application Priority Data

Dec. 25, 2002 (JP) ........................................ 2002-373592

(51) Int. Cl.[7] .............................................. A47K 4/00
(52) U.S. Cl. ........................................ 4/664; 244/118.5
(58) Field of Search ........................... 4/663, 664, 665; 244/118.5

(56) References Cited

U.S. PATENT DOCUMENTS 156,213 A * 10/1874 Ewing ............................ 4/664
4,884,767 A 12/1989 Shibata ..................... 244/118.5
5,150,863 A 9/1992 Hozumi ..................... 244/118.5
6,460,204 B1 * 10/2002 Krist et al. ..................... 4/663

FOREIGN PATENT DOCUMENTS

DE 298 20 581 U1 12/1999

OTHER PUBLICATIONS

European Search Report dated Sep. 28, 2004, 3 pgs.

* cited by examiner

Primary Examiner—Robert M. Fetsuga
(74) Attorney, Agent, or Firm—Westerman, Hattori, Daniels & Adrian, LLP

(57) ABSTRACT

A washstand unit 10, a waste storage compartment 11, a mirror 12, an upper cabinet 13 and a lighting equipment 14 are disposed on a side panel 5. Fitting concave portions 15 and 16 are formed on the washstand unit 10 for receiving portions of the waste storage compartment 11 and lighting equipment 14. Fitting portions 19, 20 and 21, 22 are formed on the mirror 12 for receiving portions of the upper cabinet 13 and lighting equipment 14. The washstand unit 10, the waste storage compartment 11, the mirror 12, the upper cabinet 13 and the lighting equipment 14 are mounted independently on the side panel 5 without assembling.

1 Claim, 6 Drawing Sheets

LAVATORY UNIT FOR AIRCRAFT

FIELD OF THE INVENTION

The present invention relates to a lavatory unit suitable to be mounted on an aircraft.

DESCRIPTION OF THE RELATED ART

In a lavatory unit mounted on a passenger aircraft, the outer shell of the lavatory unit is box-shaped corresponding to the space of the body section of the aircraft on which it is placed, and is formed of a honeycomb panel member.

A lavatory unit 101 for an aircraft comprises, as shown in FIGS. 4, 5 and 6, a front panel 102, a rear panel 103, a pair of left and right side panels 104 and 105, a ceiling panel 106 and a floor panel 107 that surround and define a lavatory space 108. The lavatory unit 101 further comprises a toilet 109 disposed above the floor panel 107 adjacent to the rear panel 103, a washstand 110, a mirror 111 and a lighting equipment 112 disposed on the side panel 105, an amenity storage unit 113 disposed inside the washstand 110 for storing amenities to be consumed within the lavatory space 108 of the lavatory unit 101 such as linens, paper cups, sanitary goods, waterproof waste bags and paper towels, a container storage unit 114 disposed inside the washstand 110 for storing a waste storage container (not shown), a toilet paper holder 115 formed on the front panel portion of the washstand 110, a waste flap 117 disposed on the upper panel portion of the washstand 110 that covers a waste slot 116, a faucet 118 disposed above the washstand 110, a tissue paper dispenser 119 and a paper towel dispenser 120 disposed below the mirror 111.

Conventionally, the lavatory unit for an aircraft comprises components such as the washstand, the mirror and the lighting equipment that take up the whole length or width of the side panel of the lavatory unit, which must be designed and manufactured to correspond to the side panel.

Since the shape and design of the washstand, the mirror, the lighting equipment and other components to be disposed within the lavatory unit must be varied so as to correspond to the model of the aircraft on which the unit is to be mounted, the position within the cabin of the aircraft to which the lavatory unit is to be placed and the size and shape of the shell of the lavatory unit, costs related to the designing and the preparation (forming die, tools, manufacturing procedure) for manufacturing the components occur repeatedly.

Since these components (washstand, mirror, lighting equipment) are built specially for aircrafts, the number of components to be manufactured is very small from the beginning, and since the components are designed individually, the number of components having the same design is limited, and thus the cost of each component is high.

SUMMARY OF THE INVENTION

The present invention provides a lavatory unit for an aircraft that solves the problems of the prior art, comprising a washstand unit, a waste storage compartment, a mirror, an upper cabinet and a lighting equipment that can be disposed on the side panel independently without having to assemble the components. According to the present invention, the number of steps required for designing the washstand unit, the waste storage compartment, the mirror, the upper cabinet and the lighting equipment can be minimized, and the fixing of these components on the side panel can be carried out easily without being affected by the difference in size or shape of the shell of the lavatory. Moreover, the components of the present lavatory unit can be mass-produced, by which the costs of the components can be cut down, and since the components do not take up the whole side panel of the lavatory unit, the lavatory space can be utilized more effectively.

The lavatory unit for an aircraft according to the present invention having a front panel, a rear panel, a pair of left and right side panels, a ceiling panel and a floor panel that surround and define a lavatory space, comprises: a toilet unit disposed above the floor panel adjacent to the rear panel; a washstand unit disposed on the side panel; a waste storage compartment disposed on one side of the washstand unit on the side panel formed separately from the washstand unit; a mirror disposed above the washstand unit on the side panel; an upper cabinet for storing amenities disposed on one side of the mirror on the side panel formed separately from the mirror; and a vertical lighting equipment disposed on the other side of the washstand unit and the mirror on the side panel formed separately from the mirror and the washstand unit; wherein the washstand unit comprises two mutually symmetric fitting concave portions for fitting a portion of the waste storage compartment and a portion of the lighting equipment, respectively, and the mirror comprises two fitting portions for fitting a portion of the upper cabinet and a portion of the lighting equipment, respectively.

DETAILED DESCRIPTION OF THE PREFERRED EMBODIMENT

The preferred embodiment of the present invention will now be explained with reference to the accompanying drawings.

Figure 1:
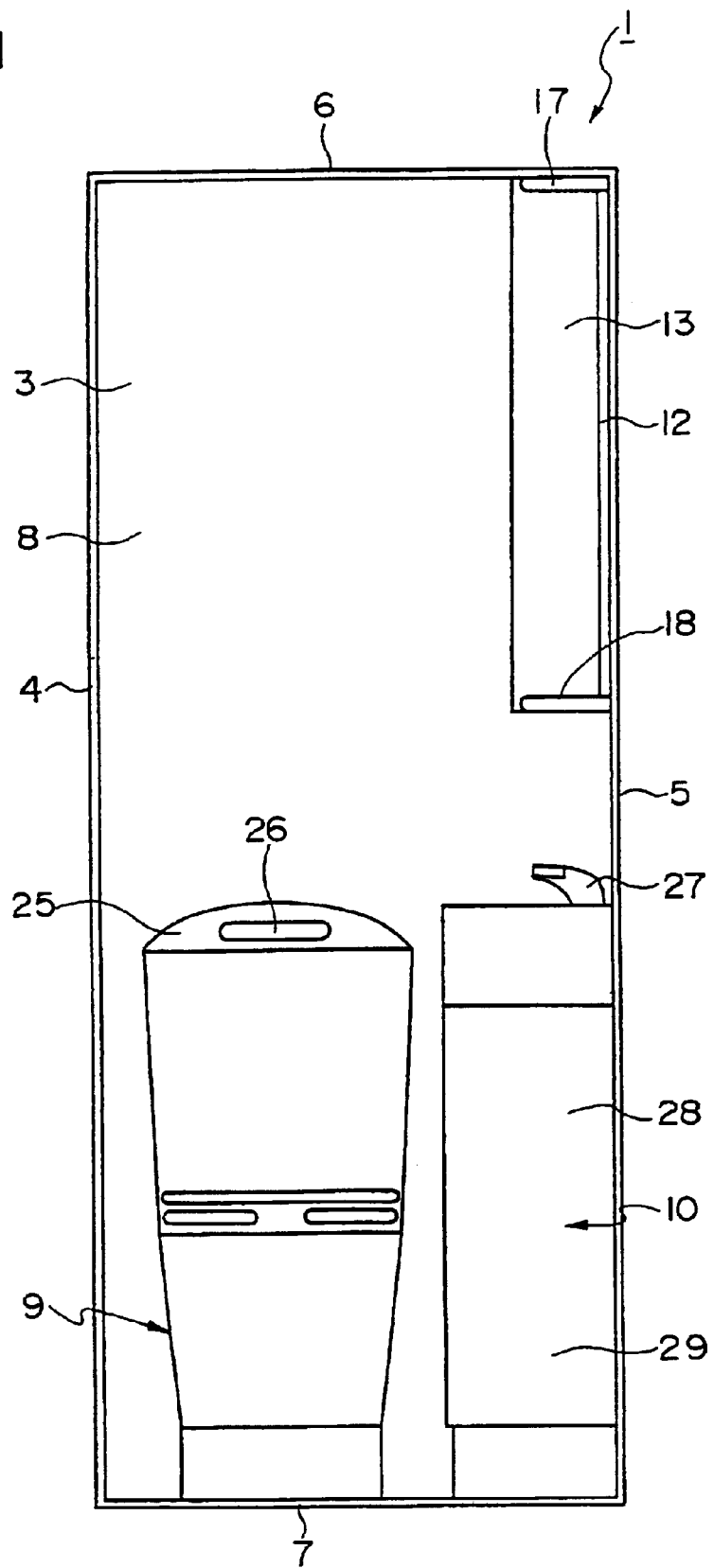
FIG. 1 is a front view showing the main portion of a lavatory unit for an aircraft according to the embodiment of the present invention.
Figure 2:
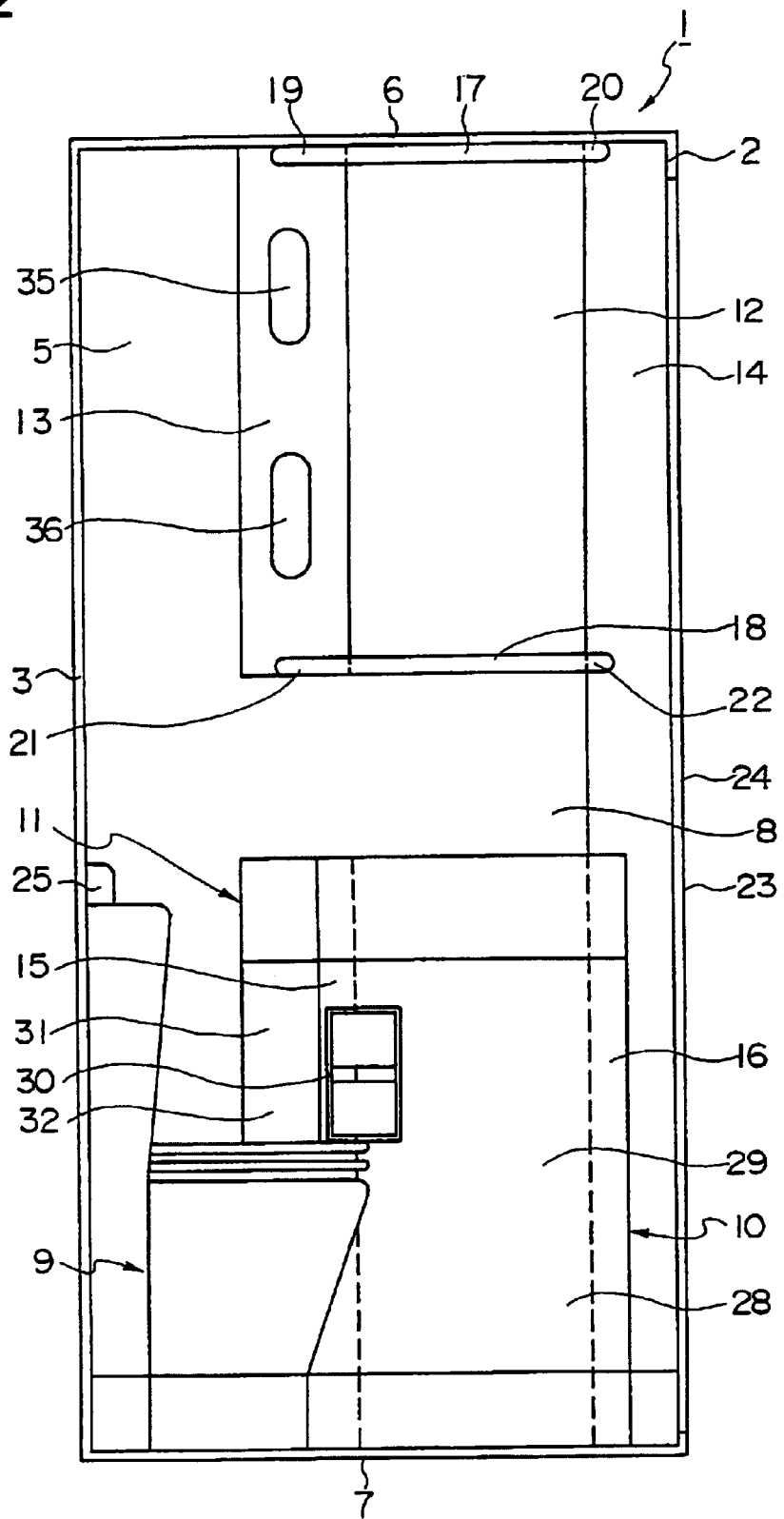
FIG. 2 is a side view showing the main portion of the lavatory unit for an aircraft according to the embodiment of the present invention.
Figure 3:
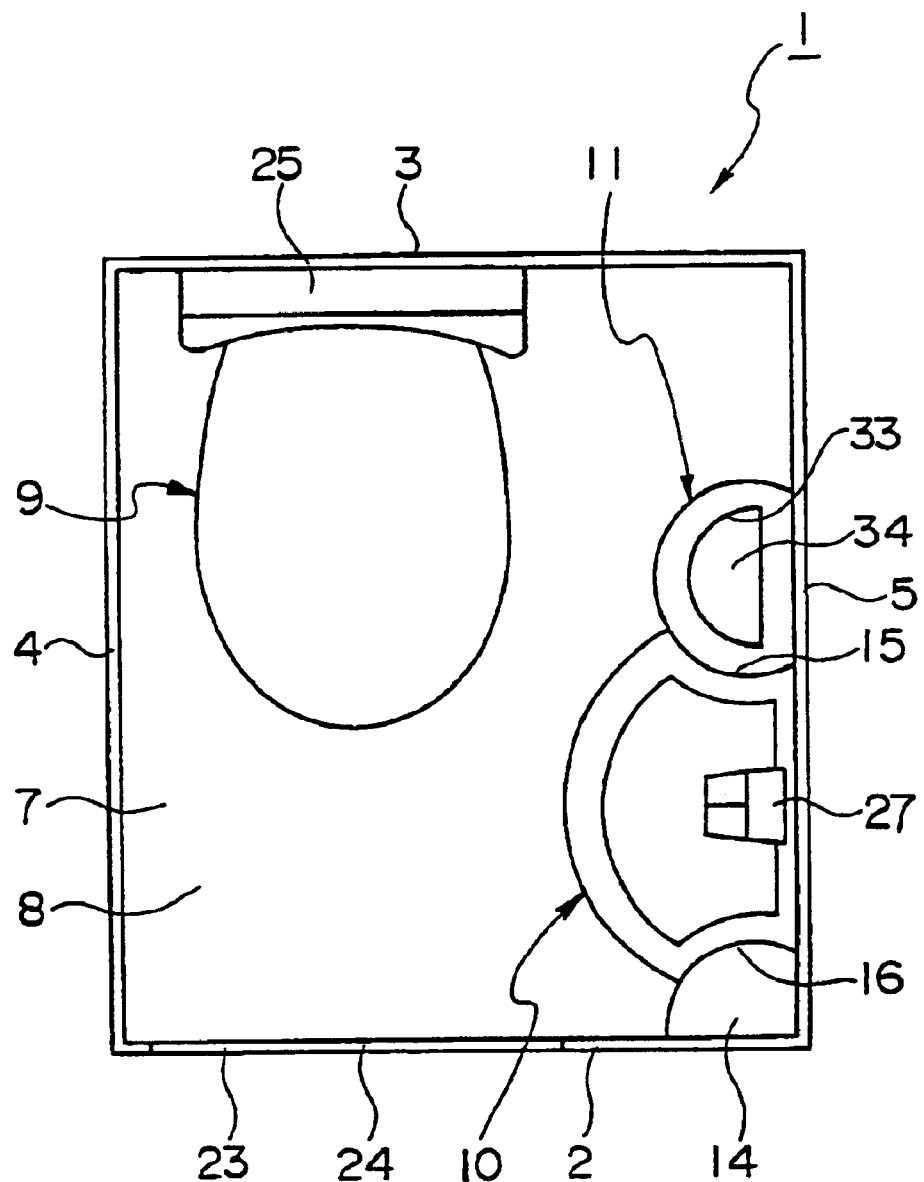
FIG. 3 is a plan view showing the main portion of the lavatory unit for an aircraft according to the embodiment of the present invention.
Figure 4:
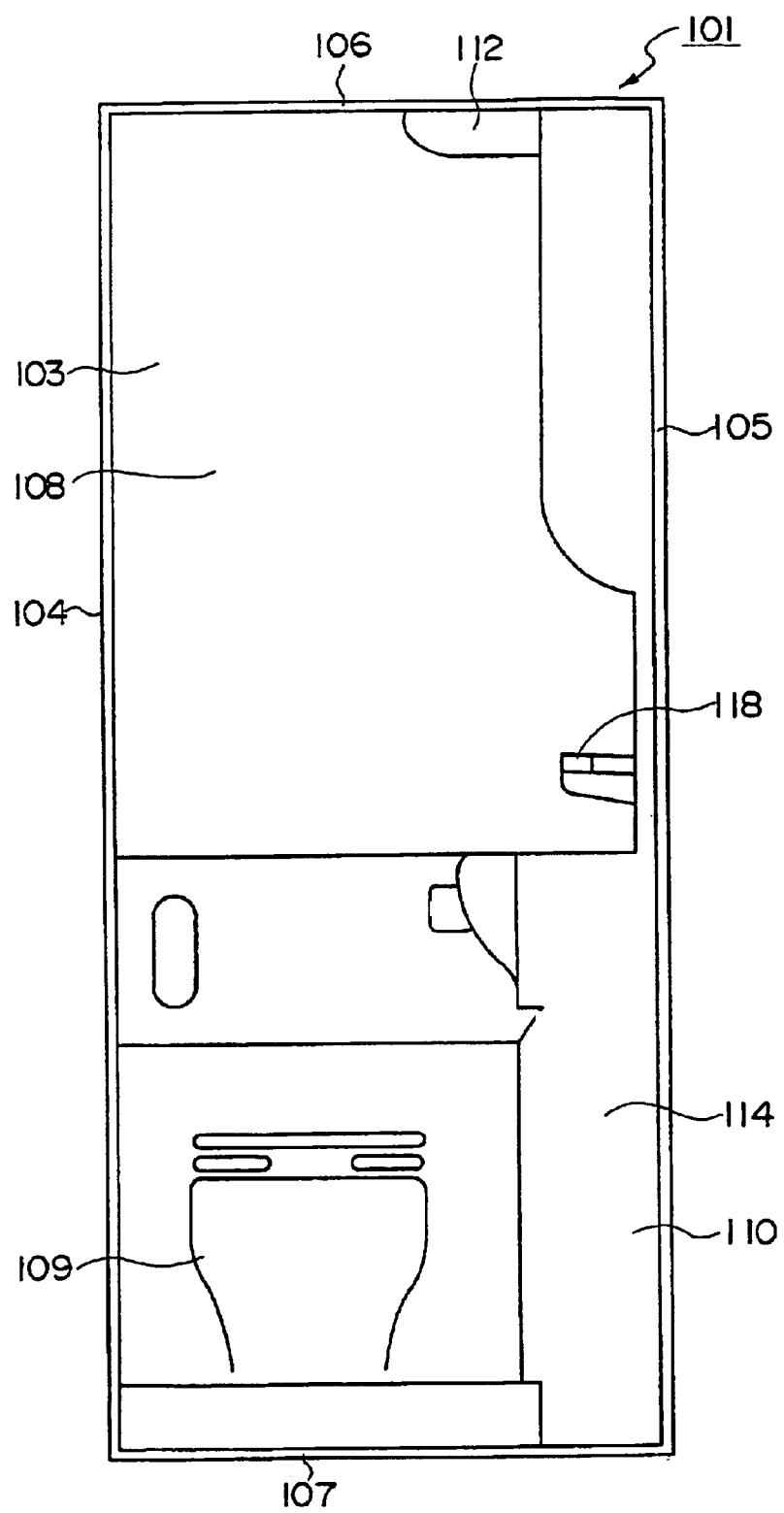
FIG. 4 is a front view showing the main portion of the lavatory unit for an aircraft according to the prior art.
Figure 5:
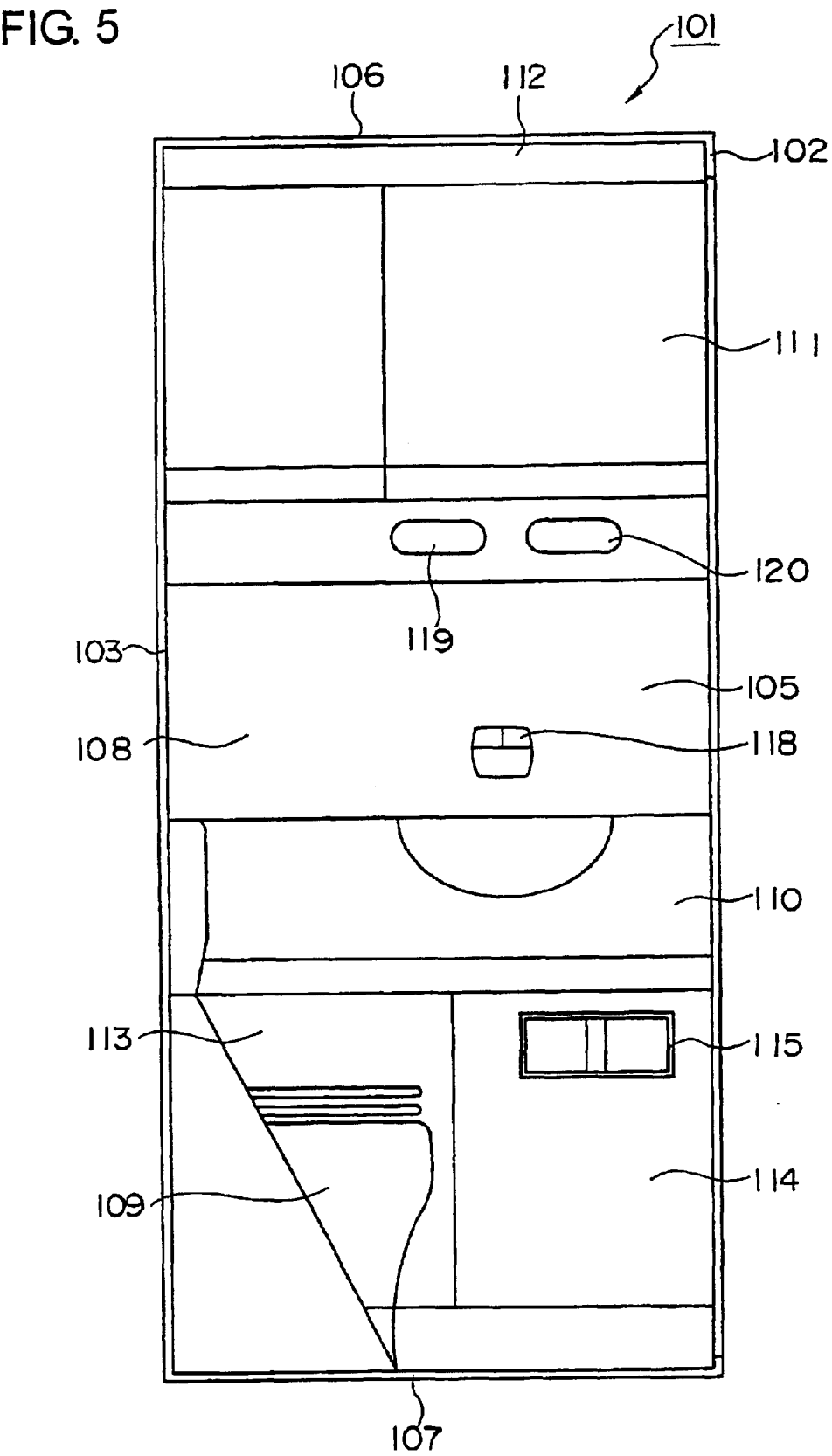
FIG. 5 is a side view showing the main portion of the lavatory unit for an aircraft according to the prior art.
Figure 6:
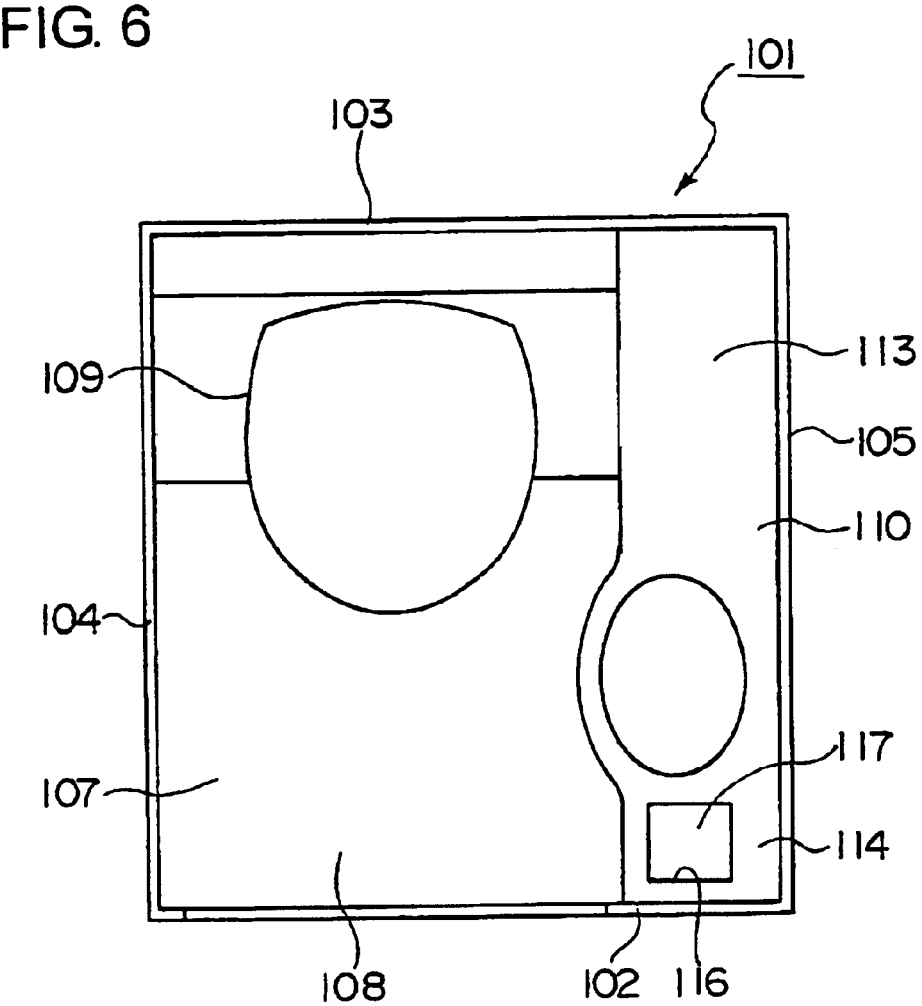
FIG. 6 is a plan view showing the main portion of the lavatory unit for an aircraft according to the prior art.

FIG. 1 is a front elevational view showing the main portion of the lavatory unit for an aircraft according to the preferred embodiment of the present invention, FIG. 2 is a side view showing the main portion of the lavatory unit for an aircraft according to the invention, and FIG. 3 is a plan view showing the main portion of the lavatory unit for an aircraft according to the invention.

A lavatory unit 1 for an aircraft according to the present invention comprises, as shown in FIGS. 1, 2 and 3, a front panel 2, a rear panel 3, a pair of left and right side panels 4 and 5, a ceiling panel 6 and a floor panel 7, which surround and define a lavatory space 8.

As illustrated in FIGS. 1, 2 and 3, above the floor panel 7 is disposed a toilet unit 9 adjacent to the rear panel 3, and a washstand unit 10 disposed on the right side panel 5. On one side of the washstand unit 10 on the side panel 5 is disposed a vertical waste storage compartment 11 that is formed separately from the washstand unit 10. A mirror 12 is disposed above the washstand unit 10 on the side panel 5, and on one side of the mirror 12 on the side panel 5 is disposed a vertical upper cabinet 13 formed as a separate component for storing amenities such as tissue paper and paper towels. On the other side of the washstand unit 10 and mirror 12 on the side panel 5 is disposed a vertical lighting equipment 14 formed also as a separate component.

As shown in FIGS. 2 and 3, the washstand unit 10 comprises two fitting concave portions 15 and 16 that are mutually symmetric, for receiving a portion of the waste storage compartment 11 and a portion of the lighting equipment 14, respectively.

On the upper and lower rims of the mirror 12 are disposed an upper horizontal plate 17 and a lower horizontal plate 18 which protrude toward the lavatory space 8, respectively, as shown in FIGS. 1 and 2. The upper horizontal plate 17 and the lower horizontal plate 18 of the mirror 12 are provided with two fitting portions 19, 20 and 21, 22, respectively, that receive a portion of the upper cabinet 13 and the lighting equipment 14.

As illustrated in FIGS. 1, 2 and 3, the lavatory unit 1 comprises a front panel 2 that faces the aisle of the aircraft, a rear panel 3 that opposes to the front panel 2, left and right side panels 4 and 5 that connect the front panel 2 and the rear panel 3, and a ceiling panel 6 and a floor panel 7 that connect the front panel 2, the rear panel 3 and the side panels 4, 5 together to form a box shape.

The front panel 2, the rear panel 3, the side panels 4, 5, the ceiling panel 6 and the floor panel 7 that constitute the outer contour of the lavatory unit 1 are formed of honeycomb sandwich panels or the like made of reinforced plastic.

On the front panel 2 of the lavatory unit 1 is formed an opening 23 through which the user of the lavatory enters and exits, as shown in FIGS. 2 and 3.

A door 24 for closing the opening 23 is disposed on the opening 23 of the front panel 2 in such a manner that one side rim of the door 24 is rotatably supported via hinges (not shown) by the front panel 2.

Above the toilet unit 9 is disposed a seat cover storage cabinet 25 for storing seat covers for the toilet, and the cabinet 25 is equipped with a seat cover dispenser 26.

On the upper portion of the washstand unit 10 is disposed a faucet 27 for feeding cold or hot water, and in the interior of the washstand unit 10 is formed an amenity storage unit 28 for storing amenities consumed in the lavatory space 8 of the lavatory unit 1, such as paper cups, sanitary goods, waterproof waste bags and paper towels. A front door 29 capable of an open/close movement is disposed on the front portion of the washstand unit 10, and on the front door 29 is formed a toilet paper holder 30.

As shown in FIG. 2, a container storage unit 31 for storing a waste container (not shown) is formed to the interior of the waste storage compartment 11, and on the waste storage compartment 11 is disposed a storage door 32. Further, on the upper surface of the waste storage compartment 11 is disposed a waste flap 34 capable of being opened and closed freely and shutting the slot 33 through which waste is thrown out.

As shown in FIG. 2, the upper cabinet 13 is equipped with a tissue paper dispenser 35 and a paper towel dispenser 36.

As shown in FIGS. 2 and 3, on one side of the washstand unit 10 is disposed the waste compartment 11, and a portion from the upper end to the lower end of the waste storage compartment 11 is fit to the fitting concave portion 15 of the washstand unit 10.

On the other side of the washstand unit 10 is disposed the lighting equipment 14, and a portion starting substantially at the longitudinal center and ending at the lower end of the lighting equipment 14 is fit to the fitting concave portion 16 of the washstand unit 10.

The upper cabinet 13 is disposed on one side of the mirror 12, as shown in FIG. 2, and portions of the upper end and the lower end of the upper cabinet 13 are fit to the fitting portion 19 of the upper horizontal plate 17 and the fitting portion 21 of the lower horizontal plate 18 of the mirror 12, respectively.

A lighting equipment 14 is disposed on the opposite side of the mirror 12, as shown in FIG. 2, and portions of the upper end and the longitudinal center area of the lighting equipment 14 are fit to the fitting portion 20 of the upper horizontal plate 17 and the fitting portion 22 of the lower horizontal plate 18 of the mirror 12, respectively.

As explained, the lavatory unit for an aircraft according to the present invention comprises a washstand unit, a waste storage compartment, a mirror, an upper cabinet for storing amenities and a lighting equipment, all of which are formed as separate components, so the components can be mounted onto a side panel independently without being assembled to other members. Thus, the work related to designing the washstand unit, waste storage compartment, mirror, upper cabinet and lighting equipment can be minimized. Since the fitting concave portions of the washstand unit receive portions of the waste storage compartment and the lighting equipment, and the fitting portions of the mirror receive portions of the upper cabinet and the lighting equipment, respectively, the washstand unit, the waste storage compartment, the mirror, the upper cabinet and the lighting equipment can be fixed to the side panel without being affected by the various sizes or different shapes of the lavatory shell. The present components (washstand unit, waste compartment, mirror, upper cabinet, lighting equipment) can be applied to any type of lavatory unit regardless of the model of the aircraft, the lavatory shell size or the shape thereof, so the components can be mass-produced, according to which the manufacturing cost of the components can be reduced effectively. Moreover, since the washstand unit, the waste storage compartment, the mirror, the upper cabinet and the lighting equipment do not take up the whole surface of the side panel, the space inside the lavatory can be utilized more effectively.

What is claimed is:

1. A lavatory unit for an aircraft having a front panel, a rear panel, a pair of left and right side panels, a ceiling panel and a floor panel that surround and define a lavatory space, the lavatory unit comprising:

a toilet unit disposed above the floor panel adjacent to the rear panel;

a washstand unit disposed on the side panel;

a waste storage compartment disposed on one side of the washstand unit on the side panel formed separately from the washstand unit;

a mirror disposed above the washstand unit on the side panel;

an upper cabinet for storing amenities disposed on one side of the mirror on the side panel formed separately from the mirror; and a vertical lighting equipment disposed on the other side of the washstand unit and the mirror on the side panel formed separately from the mirror and the washstand unit;

wherein the washstand unit comprises two mutually symmetric fitting concave portions for fitting a portion of the waste storage compartment and a portion of the lighting equipment, respectively, and the mirror comprises two fitting portions for fitting a portion of the upper cabinet and a portion of the lighting equipment, respectively.

* * * * *